Patented Feb. 1, 1949

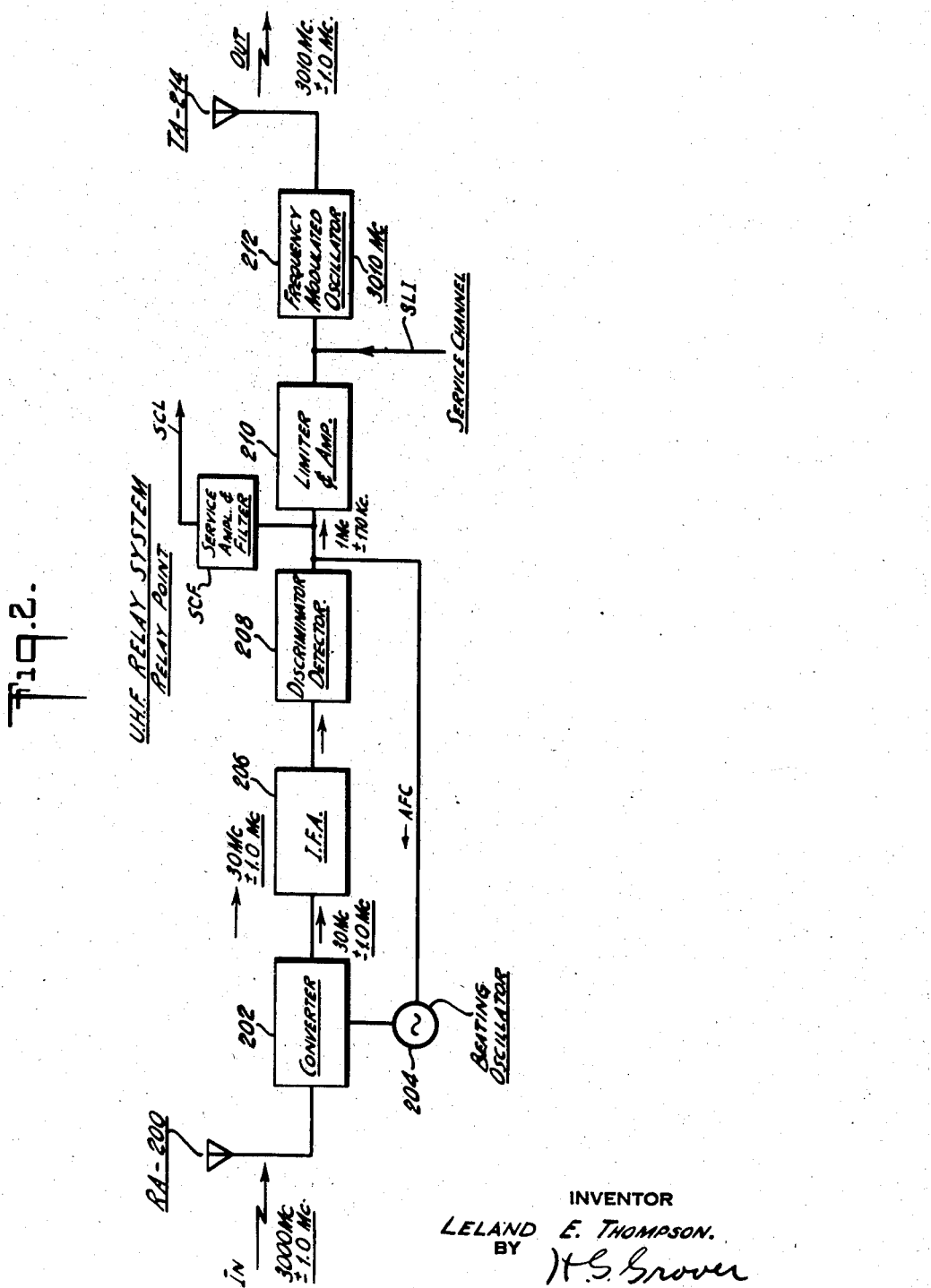

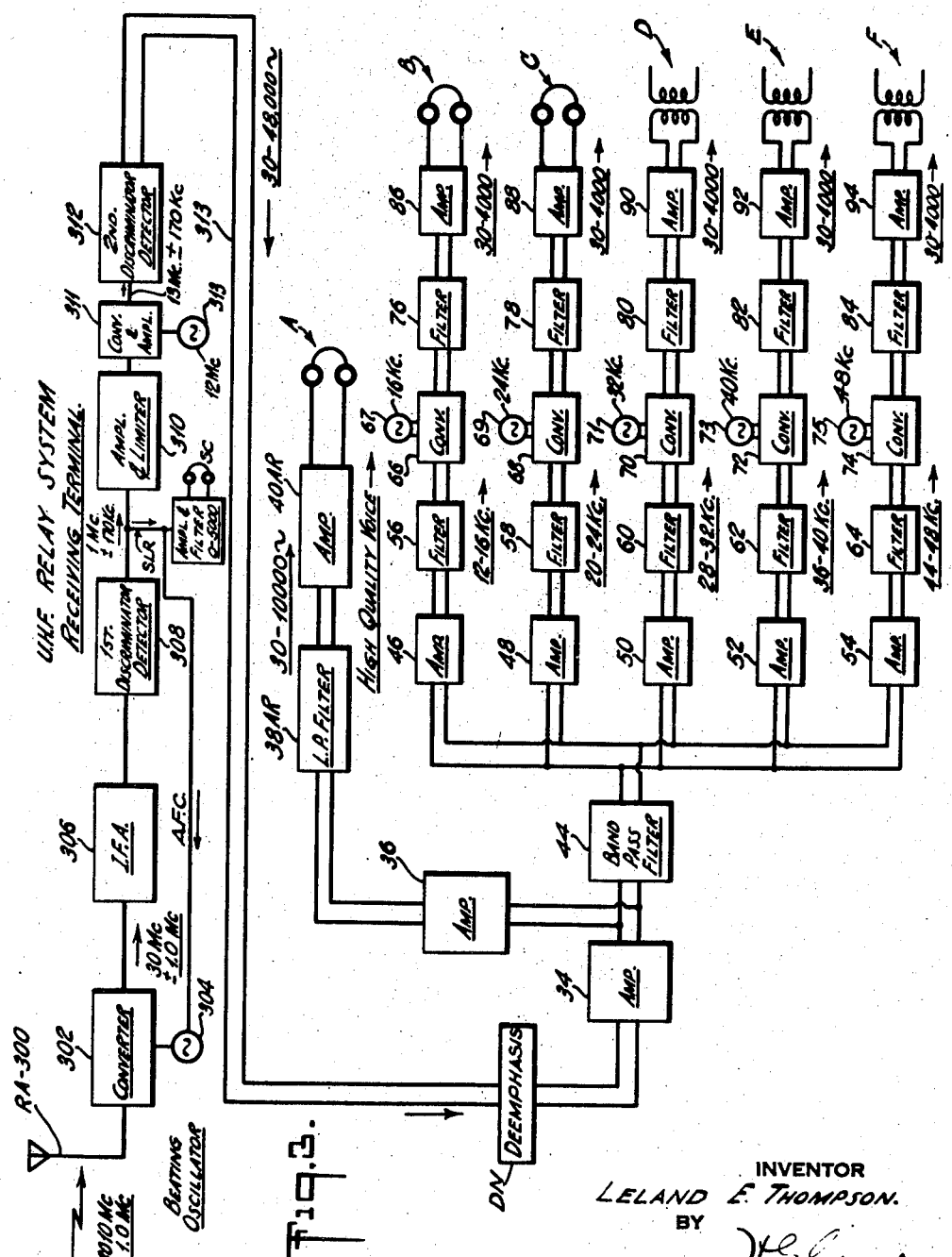

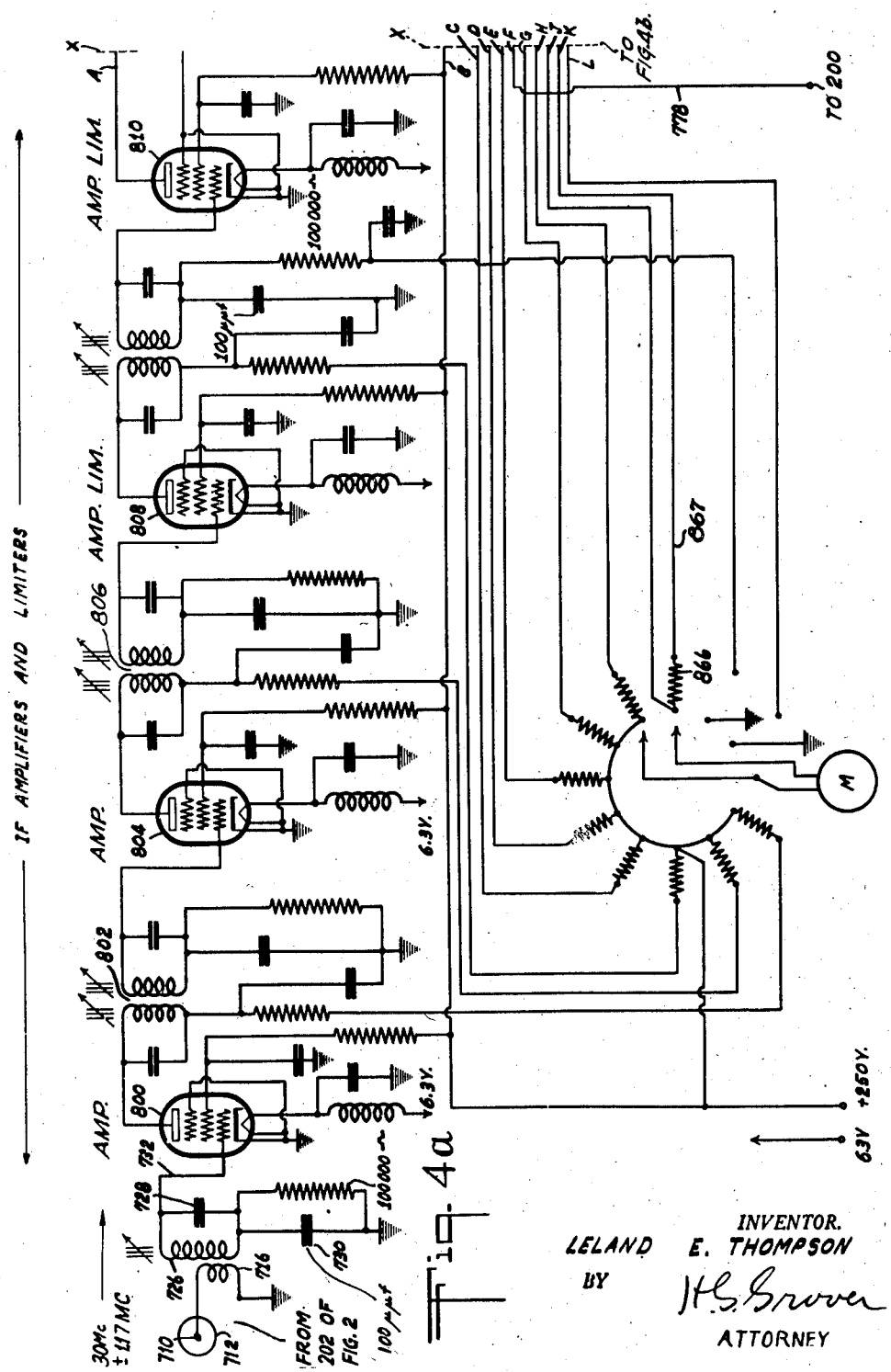

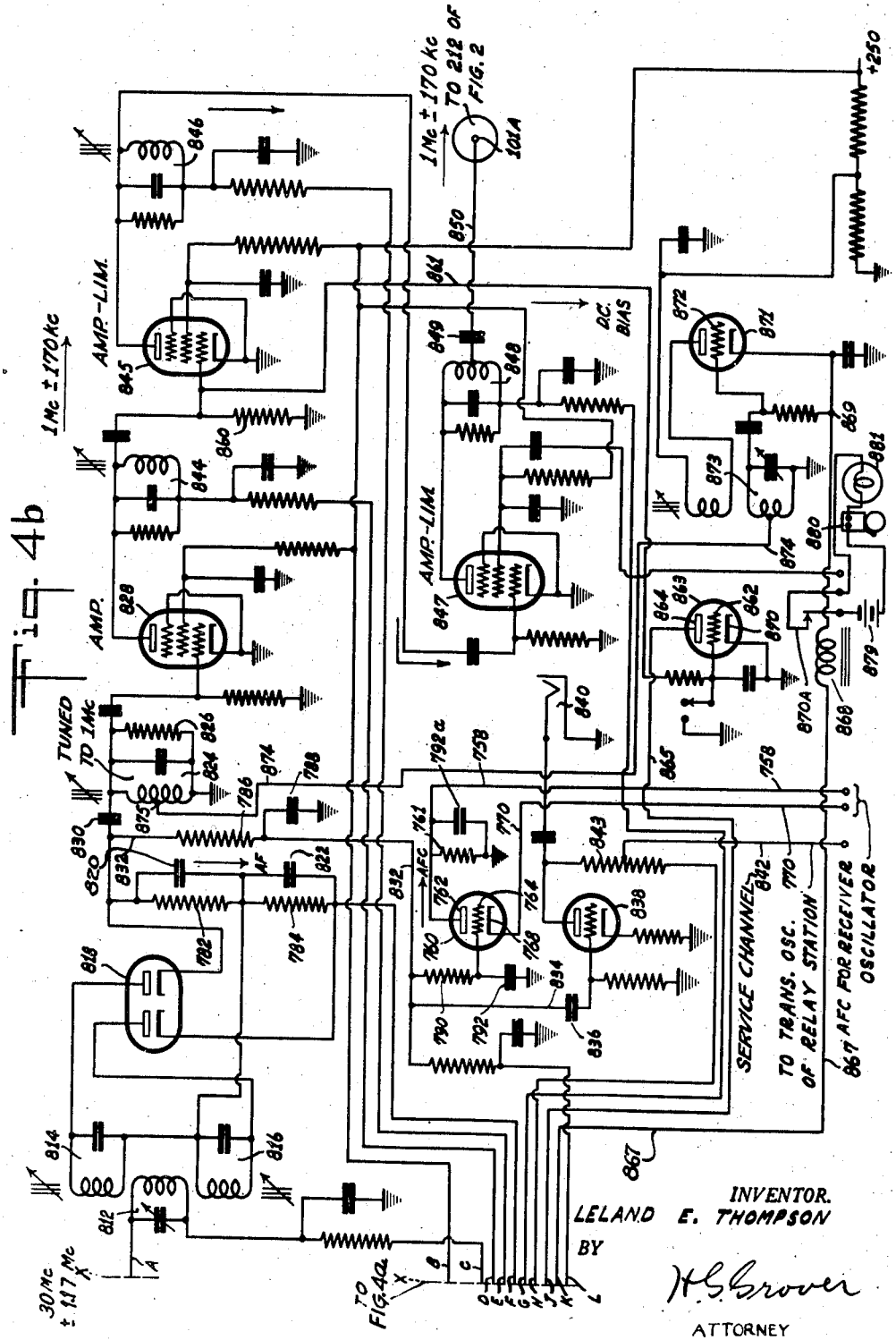

2,460,789

UNITED STATES PATENT OFFICE 2,460,789

FAULT INDICATOR FOR RADIO RELAYING SYSTEMS

Leland E. Thompson, Merchantville, N. J., assignor to Radio Corporation of America, a corporation of Delaware Original application February 6, 1945, Serial No. 576,453. Divided and this application March 15, 1946, Serial No. 654,554

11 Claims. (Cl. 177—311)

My present invention which is a division of my copending application, Serial No. 576,453, filed February 6, 1945, deals with radio relaying.

Radio relaying is useful for many purposes. For example, radio relays may be used to convey a program originating in a studio to a distant broadcast transmitter. The relay offers advantages over wire lines for that purpose since the wire lines are expensive to construct and have serious limitations with respect to frequency band widths which they are capable of transmitting. In general, unless carefully designed, costly wire lines are built, there may be serious loss in the quality and fidelity of the signals or programs carried by the lines. Radio relaying offers similar advantages over cables and wire lines, when simplex or multiplex signals are to be transmitted across rivers, bays and other bodies of water and over mountains, deserts and other difficult terrain.

When relaying with very short waves having frequencies of the order of, for example, 3000 megacycles per second the distance of transmission is limited principally by the curvature of the earth since the short radio waves tend to act like light waves and travel in straight lines without useful refraction or reflection from the Heaviside layer as is the case with longer waves. This necessitates the use of relays spaced about twenty or thirty miles apart depending upon such things as the height of the supporting structure available for the transmitting and receiving antennas. For a trans-continental radio relay employing ultra short waves it may be necessary, therefore, to use over one hundred relaying stations.

My present invention is particularly directed to and has for an object, the provision of improved apparatus for indicating failure or breakdown in any station of an extensive relay system.

In the accompanying drawings,

Figure 1 illustrates schematically a transmitting terminal for an ultra high frequency relay system. The terminal makes use of a high quality voice channel having, as indicated, an upper frequency of 10,000 cycles although if desired, this may be raised to 15,000 cycles and several other signaling channels which are transmitted to a common amplifier as side bands of suitable sub-carriers. All of the signals are combined, pre-emphasized in a suitable network and used to frequency modulate a common sub-carrier having, as illustrated, a mean frequency of one megacycle. The latter, in turn, is used to frequency modulate a transmitted carrier having a mean frequency of 3,000 megacycles.

Figure 2 is a block diagram of a typical relay station employing the principles of my present invention.

Figure 3 is a block diagram of a receiving terminal. This terminal may receive waves transmitted directly from the apparatus of Figure 1 or from a relaying point or station such as diagrammatically illustrated in Figure 2.

Figure 4 is composed of Figures 4a and 4b which are to be read as joined along the line XX so that the conductors A to L inclusive are respectively connected together. Figure 4 is illustrative of apparatus which, in accordance with my present invention, indicates breakdown at any relay station in the relaying system.

Figure 1:
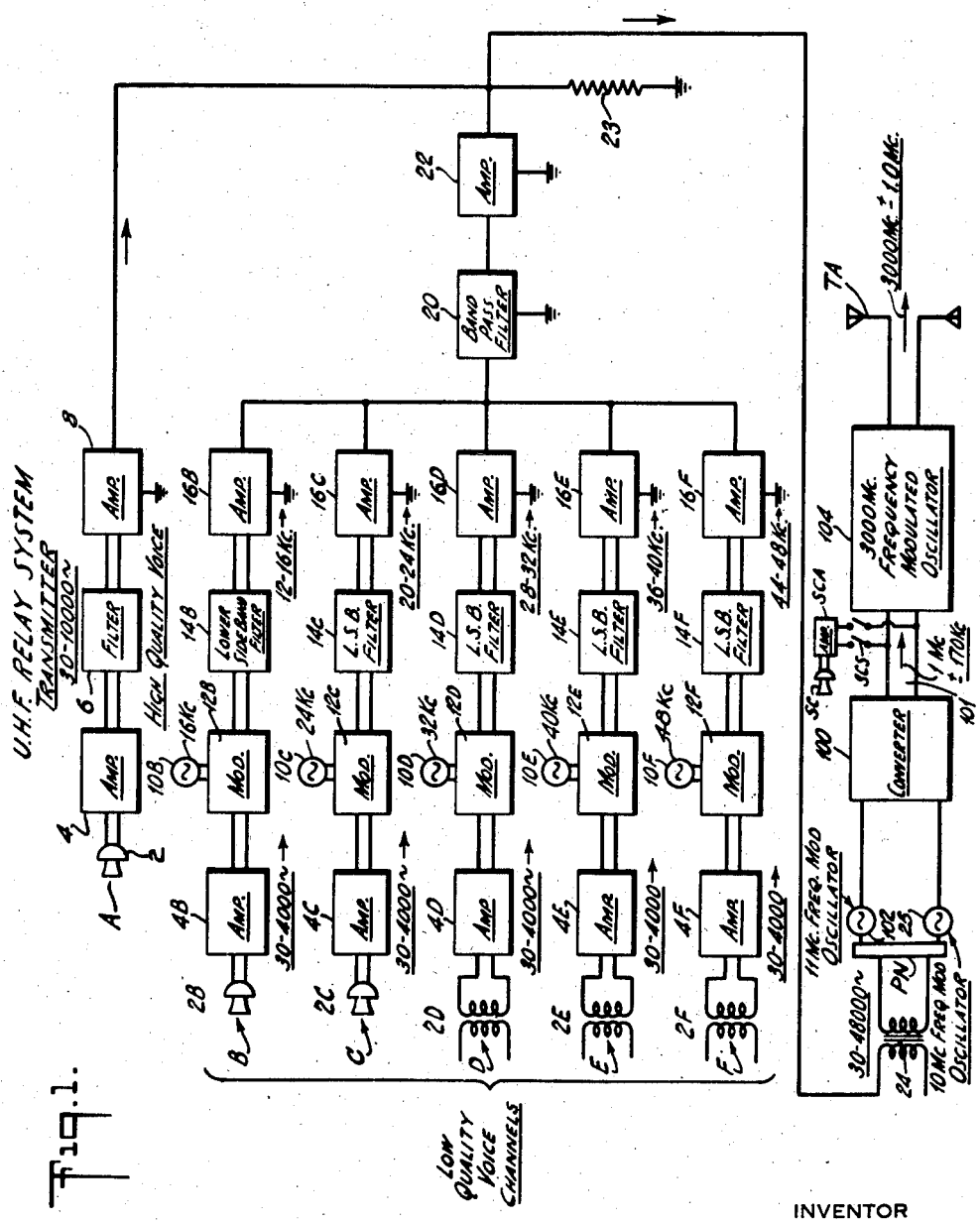

In Figure 1, several independent signaling channels are combined and modulate the waves radiated from the transmitting antenna TA to the receiving antenna RA200 of the relay station of Figure 2. The waves received at the relay station are heterodyned, amplified detected and used to modulate a different carrier frequency wave. The latter is radiated over the relay transmitting antenna TA214 to the receiving antenna RA300 of Figure 3. The received waves at the receiving terminal are amplified, translated and separated into signals corresponding to those originally transmitted.

Turning more specifically to Figure 1, the signal channels are designated by the letters A to F, inclusive. These channels are combined in resistor 23 and fed through transformer 24 and pre-emphasizing network PN to oppositely frequency modulate oscillators 25 and 102.

Oscillator 25 may operate, by way of example, at an unmodulated frequency of 10 megacycles and oscillator 102, for example, at an unmodulated frequency of 11 megacycles. The outputs of the two oscillators 25 and 102 are combined in the converter 100 as a result of which the frequency modulation appearing in the peak frequency output of converter 100 is equal to the sum of the deviations of the oscillators 25 and 102 when they are caused to separate in frequency.

It will, therefore, be apparent that each oscillator, in the arrangement of Figure 1, need swing only half as far as would be the case if only one oscillator were used to produce a given amount of frequency modulation. As a consequence, distortion is reduced since the working range of the oscillators is made smaller and over the smaller range they can be made more linear in action. Cross-modulation between channels is therefore greatly reduced. Furthermore, such an arrangement serves to reduce hum due to filament heating or ripple in the plate voltage supply.

The frequency modulated output of the converter 100 is a beat of one megacycle plus and minus 170 kilocycles and is used to frequency modulate a second frequency modulated oscillator 104 whose mean unmodulated frequency is 3000 megacycles.

As a result the wave radiated over the transmitting antenna TA of Figure 1 is a 3000 megacycle carrier having a maximum deviation of plus and minus 1.0 megacycle. A greater deviation ratio for the waves modulated in frequency modulator 104 may be used if desired so that the transmitted wave would be of the order of 3000 megacycles plus and minus two or four megacycles.

More specifically, with reference to the channels A to F, inclusive, channel A is a high quality voice channel containing all frequencies in the band from 30 to 10,000 cycles.

The high quality voice signal is picked up by microphone 2, amplified by amplifier 4 and sent through filter 6 and another amplifier 8 to the combining resistor 23.

Channels B to F, inclusive, are low quality voice channels each passing through the first amplifiers 4B, 4C, 4D, 4E and 4F, different voice signals lying in the band from 30 to 4,000 cycles. These amplified signals are fed to the modulators 12B to 12F, inclusive, supplied with oscillations from separate oscillators 10B to 10F, inclusive.

The output of the modulator 12B is fed through a filter 14B which passes only the lower side band. Similarly, filters 14C to 14F, inclusive, pass only the lower side bands produced, respectively, in modulators 12C to 12F, inclusive. In the case of filter 14B the band of frequencies passed on to amplifier 16B occupies the range from 12 to 16 kilocycles.

Similarly, the lower side band filters 14C to 14F, inclusive, pass on to amplifiers 16C to 16F, inclusive, the lower side bands derived from the immediately preceding modulators 12C to 12F inclusive. The frequency band passed by each side band filter is indicated in Figure 1. Thus 14C passes 20–24 kilocycles, etc.

The outputs of the lower side band amplifiers 16B to 16F inclusive are combined as indicated and fed through a band pass filter 20 to amplifier 22, which is made as linear as possible to prevent cross-modulation between channels. The output of amplifier 22 is combined with the output of the high quality channel from amplifier 8 in resistor 23.

The resulting voltage across resistor 23 occupies a band of frequencies from 30 to 48,000 cycles and this band is fed through transformer 24 to the oppositely frequency modulated oscillators 25 and 102 having, respectively, unmodulated carrier frequencies of ten and eleven megacycles. Adjustments are made, as explained in my parent application as, that when all of the channels are fully modulated and when they are all additive or instantaneously in phase and of the same polarity, the beat between oscillators 25 and 102 appearing in the output of converter 100 is deviated a maximum of plus and minus 170 kilocycles.

The frequency modulated output of 100, namely, a difference in frequency of one megacycle plus and minus 170 kilocycles is picked off and used to frequency modulate the second frequency modulated oscillator 104 operating at an unmodulated carrier frequency of 3000 megacycles.

The deviation ratio of the modulated waves appearing in the output circuit of the second frequency modulated oscillator 104 is unity or more, as desired, as a result of which the waves radiated over the transmitting antenna TA have for maximum deviation a frequency of 3000 megacycles plus and minus 1.0 megacycle. A larger deviation ratio may be used, in which case the radiated waves would be, for example, 3000 megacycles plus and minus 2, 3 or more megacycles when fully modulated.

The waves radiated from the transmitting antenna TA of Figure 1 may be received directly by the receiving apparatus of Figure 3. Ordinarily, however, such waves would be radiated to the receiving terminal by way of one or more relaying points, such as illustrated in Figure 2. The waves would be received at the relay point in the system at some different frequency so as to avoid feed-back or "singing" at the relay station.

In the relaying system illustrated in Figure 2, the waves are picked up or received on a receiving antenna RA200. The received waves are beat down in frequency in a converter circuit 202 with waves from a local beating oscillator 204. The intermediate frequency produced may be 30 megacycles plus and minus 1.0 megacycle. The waves of intermediate frequency are amplified in an intermediate frequency amplifier 206 and then fed to a discriminator detector 208.

The action of the discriminator detector is such as to produce a wave of one megacycle plus and minus 170 kilocycles corresponding to the output of the converter 100 of Figure 1. This wave is limited and amplified in appropriate apparatus 210 and then used to frequency modulate oscillator 212 whose unmodulated frequency may be 3010 megacycles.

By adjusting the amplitude of the output of amplifier 210 the waves radiated over the transmitting antenna TA214 of the relay point of Figure 2 may be made 3010 megacycles plus and minus 1.0 megacycle.

The waves radiated from the transmitting antenna TA214 of the relay point of Figure 2 are received on the receiving antenna RA300 of the UHF. relay system receiving terminal illustrated in Figure 3. These waves are heterodyned with waves from a local beating oscillator 304 in a converter 302 to produce an intermediate frequency of thirty megacycles plus and minus 1.0 megacycles. These waves of intermediate frequency are amplified in the intermediate frequency amplifier 306 and then fed to a first discriminator detector 308. As before explained, a high degree of amplification is secured with amplifier 306.

The output of the first discriminator detector 308 is the one megacycle plus and minus 170 kilocycle wave corresponding to the output of the converter 100 of Figure 1. The output of the first discriminator detector 308 of Figure 3 is then amplified and limited in amplifier limiter 310. Hence, it will be observed that the forward portion of the apparatus of Figure 3 from RA300 to the limiter 310 is substantially identical to the apparatus between RA200 and limiter 210 of Figure 2, as a result of which economy in the design and flexibility in the use of the apparatus are secured.

The output of the amplifier limiter 310 of Figure 3 is fed to a converter 311 supplied also with oscillations of a frequency of, for example, twelve megacycles from oscillator 313. The upper beat of converter 311 is fed to discriminator detector 312, in the output leads 313 of which appear a band of frequencies from and including 30 to 48,000 cycles corresponding to the band of frequencies fed through transformer 24 of Figure 1 to the frequency modulated oscillators 25 and 102.

Of this band of frequencies filter 38AR, to which the band is fed through amplifiers 34, 36, passes the high quality voice channel A containing waves lying in the band of 30 to 10,000 cycles. These waves are amplified in the amplifier 40AR and fed to a loudspeaker or earphones A. The other frequencies corresponding to the lower side bands of channels B to F inclusive of Figure 1 and occupying the band from 12 to 48 kilocycles are fed through band pass filter 44 and amplifiers 46 to 54 inclusive to the filters 56 to 64 inclusive.

Filters 56 to 64 inclusive pass bands of frequencies as indicated in Figure 3, namely, filter 56 passes 12 to 16 kilocycles, filter 58 passes 20 to 24 kilocycles, filter 60 passes 28 to 32 kilocycles, filter 62 passes 36 to 40 kilocycles and filter 64 passes 44 to 48 kilocycles. The outputs of filters 56 to 64 are combined in the converters 66 to 74 with oscillations from local oscillators 67, 69, 71, 73 and 75 operating, respectively, at 16 kilocycles, 24 kilocycles, 32 kilocycles, 40 kilocycles and 48 kilocycles. Each of the filters 76 to 84 is designed to pass a band of frequencies from 30 to 4000 cycles, as a result of which in the amplifiers 86 to 94 inclusive the originally transmitted signals B to F inclusive appear. These waves are individually translated as indicated, by the earphones B, C, etc.

Also it is to be noted that all of the channels need not be voice channels, but if desired, some of them may be telegraph channels, some voice and some of the other types, such as facsimile and teletype channels. Thus, as a possible alternative channel A may be replaced by twelve telegraph channels, the separate telegraph carrier tones of which may occupy the band from 465 to 2295 cycles, each tone channel having a width of 170 cycles. Thus, the first telegraph channel may be designed for a tone carrier of 465 cycles with a signaling width of plus and minus 85 cycles, the second tone channel may use a tone carrier of 595 cycles with a cycle width of plus and minus 85 cycles, etc.

In addition to channels A–F inclusive, of Figure 1, a service channel SC may be provided. The output of the service channel pick-up microphone may be amplified by the service channel amplifier SCA and switched directly, by means of switch SCS, to frequency modulate oscillator 104. Preferably, amplifier SCA passes a band of approximately 0–5000 cycles and the amplitude of the modulating voltages is adjusted so as to produce, for example, a maximum swing of ±15,000 cycles in the output of oscillator 104.

As indicated in Figure 2 the service channel band may be filtered out by filter SCF and taken from line SCL for use in earphones, or the output of line SCL may be fed by patch cords to the service line input SLI to modulate oscillator 212.

In Figure 3 the service band of frequencies may be taken directly from the output of the first discriminator detector 308 through line SLR and utilized as found desirable.

Figure 4, consisting of Figures 4a and 4b, is a more detailed diagram of the intermediate frequency amplifier, discriminator-detector and limiter amplifier 206, 208, 210 of Figure 2. Figure 4 also represents in wiring diagram form the apparatus contained within rectangles 306, 308 and 310 of Figure 3.

That is, as before explained, the output of the converter 202 of Figure 2 or 302 of Figure 3 is a wave of intermediate frequency, such as 30 megacycles having a deviation of ±1.0 megacycle. This intermediate frequency wave, as before explained in connection with Figures 2, 3 and in my parent application, is fed through transformer primary 716 (Fig. 4a) to the tuned secondary coil 726 tuned by condenser 728, the lower terminal of the tuned circuit being grounded for high frequency currents by means of a by-pass condenser 730.

As indicated in Figure 4a, the output of the tuned circuit 726, 728 is fed through lead 732 to the amplifying tube 800 which forms part of the first amplifying stage of the intermediate frequency amplifier. The output of tube 800 is fed through properly tuned circuits 802 to the second amplifying tube 804. The output of amplifier 804 is fed through tuned circuits to the amplifiers and limiters 808 and 810. To insure limiting action in tubes 808 and 810, either or both may be operated with reduced plate voltage. The output of limiter 810 is fed into a tuned circuit 812 tuned to the mid-intermediate frequency, and for the case described previously, to 30 megacycles. Circuit 812 excites the discriminator detector system comprising tuned circuits 814, 816 and the double diode detector 818. Circuits 814 and 816 are tuned so as to have overlapping resonant characteristics.

The output of the discriminator detector system 814, 816 and 818, appears across resistors 782, 784 shunted by high frequency by-passing condensers 820, 822 and fed through tuned circuit 824, broadened by the loading resistor 826, to the control grid of the amplifier 828. Circuit 824 is tuned to have a mean frequency of one megacycle corresponding to the mean frequency of the output of discriminator detector 208 and this corresponds to the mean frequency of the output of the converter 100 of Figure 1. Condenser 830 is of such value as to pass the waves of one megacycle plus and minus deviation of 170 kilocycles, but substantially impedes or otherwise blocks the frequencies of the service channel SC of Figure 1. The service channel frequencies are, therefore, fed through conductor 832, resistor 786 and condenser 836 to the audio amplifier 838 in the output of which there is provided a suitable monitoring jack 840. Also, there is provided a patch cord or lead 842 suitably tapped to the plate resistor 843 in case it is desired to modulate the high frequency oscillator 212 at the relaying point with the service channel for transmittal on to the next station whether the latter be another relaying point or terminal receiving station.

The sub-carrier frequency output of amplifier 828 (Figure 4b) is fed through tuned circuit 844, amplifier limiter 845, tuned circuit 846, amplifier limiter 847, tuned circuit 848, by-passing condenser 849, and transmission line 850 to the frequency modulated oscillator 212 of Figure 2. It will be appreciated, of course, that circuits 844, 846 and 848 of Figure 4 are tuned to the sub-carrier frequency resulting from the first discriminator detector action of 814, 818 at the relaying or receiving points. Accordingly, if used at a relaying point, such as shown at Figure 2, these circuits would be tuned to one megacycle and designed so as to be broad enough to pass a band of frequencies of ±170 kilocycles.

It is to be noted that a portion of the output of the discriminator detector arrangement 814, 816, 818 of Figure 4 is used to automatically frequency control the first beating oscillator 204 of Figure 2 or 304 of Figure 3 to maintain the beat frequency output of the converter 202 of Figure 2 or 302 of Figure 3 within the by-pass band of the intermediate frequency amplifier 206 of Figure 2 or 306 of Figure 3. That is to say, a part of the output of detector 818 of Figure 4 is fed through lead 832, resistor 786 and resistor 790 to the grid 764 of tube 760. Resistor 790 and condenser 792, the latter connected between grid 764 and ground, are chosen so as to have a time constant sufficiently fast to substantially remove the quick variations in voltage due to the modulating frequencies of the service channel. The slower variations in voltage representative of frequency drift are fed to the grid 764 so as to either increase or decrease the conductivity thereof. Accordingly, the voltage of lead 758 varies in such a way as to automatically frequency control the first beating oscillator 202 at the relaying points or 302 of the terminal receiving points as explained more fully and in greater detail in my parent application.

Should the intermediate frequency of one megacycle in the arrangement of Figure 4 fail for any reason, it will be noted that the D. C. voltage built up across resistor 860 in the grid circuit of limiter tube 845 by the normal signal will also fail. Hence, the negative voltage in conductor 861 will drop to approximately zero. As a consequence, the normal negative bias on the grid 862 of tube 863 will drop to approximately zero and this tube will conduct plate current through plate 864, lead 865, resistor 866, conductor 867, and relay coil 868, thereby effectively grounding point 869. In other words, point 869 will be brought effectively to the potential of cathode 870 of tube 863.

As a result, oscillator 871 previously blocked by application of positive potential, derived from point 869, to its grid 872 will go into oscillation and produce oscillations of a frequency determined by the tuning of its grid circuit 873 which is preferably tuned to some frequency in the intermediate frequency pass band, such as, for example, 1.1 megacycles. A part of the output of oscillator 871 is fed through lead 874 to a point 875 in tuned circuit 824.

The voltage built up across circuit 824 by waves from the local oscillator 871 is adjusted so as to be of much lower amplitude than the normal intermediate frequency signals passing through the system, as a result of which, the direct current voltage built up at 860 in the grid return for tube 845 is not sufficiently great to cut off the local oscillator 871. Hence, when transmitted signals fail to come through by measuring this intermediate frequency at some later point in the system, it will be known that failure occurred prior to that particular point in the system using an oscillator, such as 871, tuned or otherwise adjusted so as to produce a frequency of 1,100,000 cycles.

There is a further advantage to this arrangement in addition to its failure indicating function. Should the signal intermediate frequency of one megacycle fail, then it will be found that the noise level will tend to rise abruptly. The presence of the injected wave from such oscillator 871 of Figure 4 will curtail and otherwise suppress this rise in noise voltage.

Also, in order to indicate failure of the intermediate frequency signal, the relay 868 may be used to close a contact 870A completing a circuit from a source of potential 879 to an alarm bell 880 and an indicating light 881. If desired, contact 870A may be used to operate a coding device in turn used to key a tone which may be fed into the service channel or be permanently connected to the service channel so as to give a further indication, according to the particular code and tone frequency employed, of the point at which break-down occurred.

What is claimed is:

1. In combination, a high frequency amplifier comprising a tube having anode, cathode and grid electrodes, a source of waves to be amplified connected to said grid and cathode, a resistor connected between a pair of said electrodes for developing a direct current control potential in the presence of signal waves to be amplified, a high frequency oscillator, circuits utilizing said direct current potential to prevent said oscillator from oscillating and for permitting said oscillator to oscillate in the absence of said control potential, and a circuit for feeding a potential from said oscillator to the input of said amplifier when said control potential fails.

2. Apparatus as claimed in the preceding claim, characterized by the fact that said oscillator is connected to a point of relatively low impedance in the input circuit of said amplifier.

3. In combination, an amplifier having an anode, a cathode and a grid, a circuit including a coil connected between said cathode and grid for subjecting the input electrodes of said amplifier to alternating waves to be amplified, a resistor connected between said grid and cathode, said resistor having direct current control potentials developed thereacross in the presence of signal waves to be amplified, an oscillation generator adapted to generate waves of a frequency lying in the range of frequencies amplified by said amplifier, a circuit connected from said resistor to apply said control potentials to said generator in such a way as to prevent oscillation generation thereby when said control potential is developed, and a connection from said oscillation generator to a point of low impedance on said coil, said connection serving to feed waves from said generator into the input circuit of said amplifier when said control potential drops to a value such as to allow said oscillation generator to generate oscillations.

4. In combination, an amplifier having an anode, a cathode and a grid, an output circuit coupled to the anode and cathode of said amplifier, an input circuit adapted to convey waves to be amplified connected to said grid and cathode, a resistance connected between said grid and cathode across which a direct current voltage arises when input waves are fed to said grid and cathode, an indicating device and instrumentalities connecting said resistance to said indicating device, said instrumentalities including a vacuum tube, for causing operation of said indicating device in the absence of direct current flow through said resistance.

5. In combination, a first amplifier tube having an anode, a cathode and a grid, an input circuit including a coil connected between said cathode and grid for subjecting the input electrodes of said amplifier to alternating waves to be amplified, a second amplifier tube, a resistor connected between said grid and cathode of said second amplifier tube, said resistor having direct current control potentials developed thereacross in the presence of signal waves to be amplified, an oscillation generator adapted to generate waves of a frequency lying in the range of frequencies amplified by said amplifier, a circuit connected from said resistor to apply said control potentials to said generator in such a way as to prevent oscillation generation thereby when said control potential is developed, and a connection from said oscillation generator to a point of low impedance on said coil in the input circuit of the first tube, said connection serving to feed waves from said generator into the input circuit of said amplifier tube when said control potential drops to a value such as to allow said oscillation generator to generate oscillations.

6. In electrical apparatus, a vacuum tube operating as a limiter, said tube having anode, cathode and grid electrodes, a circuit for applying waves to be limited across the grid and cathode of said limiter, an output circuit connected to the anode and cathode of said limiter, a resistor connected between two of the electrodes of said limiter tube whereby a voltage is developed across said limiter in the presence of predetermined input waves across the grid and cathode of the limiter, an oscillation generator the operation of which is to be controlled and circuits responsive to the voltage drop across said resistor to control the operation of said oscillation generator and means for utilizing oscillations generated by said generator to convey information as to the failure of application of said waves to the limiter.

7. Apparatus as claimed in claim 6 characterized by the fact that a circuit is provided for feeding waves from said oscillation generator to the input side of said limiter.

8. Apparatus as claimed in claim 6 characterized by the fact that the waves normally fed to the grid and cathode of said limiter are frequency modulated; and by the fact that the resistor is connected between the grid and cathode of said limiter tube.

9. In electrical apparatus, a vacuum tube limiter having an anode, a cathode and a grid, an input circuit connected between the grid and cathode, an output circuit connected between the anode and cathode, means for feeding waves in said input circuit, said waves being repeated in said output circuit, a resistor connected between two of the electrodes of said tube, the connection being such that a control voltage is developed across said resistor in the presence of input waves of predetermined amplitude, an oscillation generator, the output of which is to be controlled, a control tube having an anode, a cathode and a grid, a circuit for feeding the voltage drop across said resistor to the grid and cathode of said control tube and instrumentalities for utilizing the anode-cathode circuit of said control tube to control the output of said generator and means for utilizing oscillations generated by said generator to convey information as to the failure of application of said waves in said input circuit to said limiter.

10. Apparatus as claimed in claim 9 characterized by the fact that said vacuum tube operates as a limiter; by the fact that frequency modulated waves are fed to the input side thereof for repetition in the output circuit thereof and by the fact that a circuit is provided for feeding waves from said oscillation generator to the input side of said limiter.

11. Apparatus as claimed in claim 10 characterized by the fact that said resistor is connected between the grid and cathode of the limiter.

LELAND E. THOMPSON.

REFERENCES CITED

The following references are of record in the file of this patent:

UNITED STATES PATENTS

| Number | Name | Date |
|---|---|---|
| 2,296,384 | Hansell | Sept. 22, 1942 |
| 2,315,434 | Leibe | Mar. 30, 1943 |
| 2,315,435 | Leibe | Mar. 30, 1943 |